United States Patent

Coosemans et al.

[11] Patent Number: 5,741,565
[45] Date of Patent: Apr. 21, 1998

[54] CAST FILM OF PROPYLENE POLYMERS

[75] Inventors: Pierre Coosemans, Hoeilaart, Belgium; Giuseppe Lesca, Milan, Italy; Daniele Romanini, Ferrara, Italy; Roberto Tanganelli, Florence, Italy

[73] Assignee: Montell North America Inc., Wilmington, Del.

[21] Appl. No.: 506,467

[22] Filed: Jul. 25, 1995

Related U.S. Application Data

[63] Continuation of Ser. No. 286,023, Aug. 4, 1994, abandoned.

[30] Foreign Application Priority Data

Aug. 11, 1993 [IT] Italy .................. MI93A1815

[51] Int. Cl.$^6$ .................. B32B 27/32; B65D 85/60
[52] U.S. Cl. .................. 428/35.2; 428/212; 428/516; 426/106; 426/108; 426/415; 206/484; 206/484.2
[58] Field of Search .................. 428/516, 349, 428/332, 212, 35.2, 35.7; 525/240; 426/415, 106, 108; 206/484, 484.2

[56] References Cited

U.S. PATENT DOCUMENTS

| | | | |
|---|---|---|---|
| 4,297,415 | 10/1981 | Ward et al. | 428/516 |
| 4,302,504 | 11/1981 | Lansbury et al. | 428/332 |
| 5,212,246 | 5/1993 | Ogale | 525/240 |
| 5,283,118 | 2/1994 | Murakami et al. | 428/349 |
| 5,292,563 | 3/1994 | Peiffer et al. | 428/35.9 |
| 5,300,365 | 4/1994 | Ogale | 428/461 |
| 5,318,842 | 6/1994 | Ogale | 428/349 |
| 5,451,455 | 9/1995 | Peiffer et al. | 428/516 |

FOREIGN PATENT DOCUMENTS

| | | |
|---|---|---|
| 0483675 | 6/1992 | European Pat. Off. . |
| 54-114586 | 9/1979 | Japan . |

*Primary Examiner*—Rena Dye

[57] ABSTRACT

Disclosed is a multilayered cast film which has an elongation at break greater than 100%. It comprises:

A) at least one layer of a crystalline homopolymer of a $C_3$–$C_6$ α-olefin, or a random copolymer of propylene with ethylene and/or a $C_4$–$C_{10}$ α-olefin, or a composition of crystalline random copolymers of propylene with ethylene and/or a $C_4$–$C_8$ α-olefin (Component A); and B) at least one layer of a propylene homopolymer, or a propylene copolymer with ethylene or a $C_4$–$C_{10}$ α-olefin, or a propylene copolymer with ethylene and a $C_4$–$C_{10}$ α-olefin, having an elongation at break lower than 30% (Component B).

5 Claims, No Drawings

CAST FILM OF PROPYLENE POLYMERS

This application is a continuation, of application Ser. No. 08/286,023, filed Aug. 4, 1994 now abandoned.

The present invention relates to multilayered polypropylene cast films having improved creasability characteristics, and in particular it relates to multilayered polypropylene cast films where at least one layer has higher stiffness and/or lower elongation at break than the other layer.

Due to their mechanical and physical properties, the multilayered films according to the present invention are particularly suitable to be used in the packaging field, especially in confectionery packaging.

Multilayered films that can be used in a variety of fields, especially in food packaging, are already known in the art. Films which are prepared using solely propylene homopolymer present some drawbacks, such as brittleness, failure to maintain creases and low impact resistance.

In order to overcome some of said drawbacks of polypropylene films, the polypropylene used either has some particular properties (as in published European patent application EP-A-432452), or it is coextruded with hydrogenated resins (as in published European patent application EP-A 544632).

European patent application EP-A 432452 describes monooriented films, mono- and multilayered, of polypropylene and propylene copolymers, which offer both transparency and capacity of keeping a crease. Said patent application teaches that the latter characteristic is obtained by using a propylene homo- or copolymer having a narrow molecular weight distribution.

Now new films have been found which have good creasability properties and, therefore, are capable of holding a crease well. Said property makes the films of the present invention particularly suitable for use in the packaging field, particularly for the uses mentioned above.

Unlike the propylene homo- and co-polymers mentioned in the above EP-A-432452 patent application, the homo- and co-polymers which constitute a layer of the film of the present invention,. in view of the fact that they have a wide molecular weight distribution, also have physico-mechanical characteristics which enable them to maintain a crease.

An added advantage of the films of the present invention is that they present good transparency. One more advantage displayed by the films of the present invention is that when said films comprise some of the polymers specified below, they also exhibit good thermosealability properties. The latter allow one to obtain, whenever necessary, an airtight seal of the packaged article, which may be valuable for some uses.

Yet another advantage is that the films of the present invention are airtight, thus guaranteeing a longer preservation of the product which is wrapped in them.

The present invention provides a multilayered cast film comprising:

A) at least one layer consisting essentially of a crystalline homopolymer of a $C_3$–$C_6$ α-olefin, or a random copolymer of propylene with ethylene and/or a $C_4$–$C_{10}$ α-olefin, or a composition of crystalline random copolymers of propylene with ethylene and/or a $C_4$–$C_8$ α-olefin (Component A); and B) at least one layer consisting essentially of a propylene homopolymer, or a propylene copolymer with ethylene or a $C_4$–$C_{10}$ α-olefin, or a propylene copolymer with ethylene and a $C_4$–$C_{10}$ α-olefin, said homopolymer and copolymers having an elongation at break lower than 30% (Component B);

said film having an elongation at break greater than 100%, preferably higher than 200%, more preferably higher than 500%.

Preferably, Component A presents an elongation at break greater than 350%, more preferably greater than 500%; for Component B, on the other hand, it is best if the elongation at break is less than 25%. Moreover, the flexural modulus (FM) of Component B is preferably higher than 1600 MPa, more preferably higher than 2000 MPa.

In an example of an embodiment of the present invention the film comprises only two layers, specifically a layer of Component B bonded to a layer of Component A.

The preferred film is made up of three layers, in which case Component B is placed between two outer layers of Component A, or Component A is placed between two outer layers of Component B. The preferred composition is when Component B is in the middle and Component A makes up the two outer layers.

Component A is preferably a composition of propylene crystalline random copolymers, where the comonomer is ethylene and/or a $C_4$–$C_8$ α-olefin. Preferably said composition comprises (percentages by weight):

1) from 30 to 65%, preferably from 35 to 65%, more preferably from 45 to 65%, of a copolymer of propylene with a $C_4$–$C_8$ α-olefin, containing from 80 to 98%, preferably from 85 to 95% of propylene; and 2) from 35 to 70%, preferably from 35 to 65%, more preferably from 35 to 55%, of a propylene copolymer with 2–10%, preferably 7–9%, of ethylene, or a copolymer of propylene with 0.5–5%, preferably 1–3%, of ethylene and 2–10%, preferably 3–6%, of a $C_4$–$C_8$ α-olefin.

As previously stated, component A can also be a homopolymer, e.g. of propylene, 1-butene or 4-methyl-1-pentene, or a copolymer of propylene. Specific examples of propylene copolymers particularly adequate for Component A are:

1) crystalline random copolymers of propylene containing from 1.5 to 20% by weight of ethylene or a $C_4$–$C_8$ α-olefin; and 2) crystalline random copolymers of propylene containing from 85 to 96% by weight of propylene, from 1.5 to 5% by weight of ethylene and from 2.5 to 10% by weight of a $C_4$–$C_8$ α-olefin.

The homopolymers and copolymers comprising Component A can be prepared by way of single stage polymerization or multi-stage sequential polymerization using Ziegler-Natta catalysts.

Examples of copolymers of Component A are described in published European patent applications EP-A 0483523 and EP-A 0560326.

Component B can either be another propylene homopolymer, or a propylene random copolymer with ethylene and/or one or more α-olefins, preferably $C_4$–$C_8$, or a heterophasic copolymer.

Generally, the polymers and copolymers comprising Component B, which are characterized by low elongation at break and, generally, by high flexural modulus values, are prepared with highly stereospecific Ziegler-Natta catalysts, in one or more polymerization stages. Therefore, the isotactic index of the polymer products is relatively high, generally higher than or equal to 94%, preferably higher than or equal to 96%, as measured in xylene at 25° C. Moreover, the molecular weight distribution is generally wide, preferably with $\overline{M}_w/\overline{M}_n$ values ranging from 8 to 30 ($\overline{M}_w$ and $\overline{M}_n$ indicate weight average molecular weight and number average molecular weight, respectively). Examples of the above mentioned polymers are described in European patent application EP-A 0573862, European patent application EP-A 0098077 and Kokai Japanese patent application 59-172507.

The $C_4$–$C_8$ α-olefins suitable for copolymerization with propylene to obtain the copolymers of Components A and B used in the present invention comprise both linear and branched α-olefins, such as for example: 1-butene, 1-pentene, 1-hexene, 1-octene, 3-methyl-1-pentene, 4-methyl-1-pentene and 3-methyl-1-hexene. The preferred α-olefin is 1-butene.

The quantity of comonomer in the copolymer of B ranges preferably from 0.5 to 2% by weight with respect to the total polymer if the comonomer is ethylene. If the comonomer is a $C_4$–$C_8$ α-olefin, said quantity preferably ranges from 0.5 to 5%.

In order to obtain cast films having good thermosealability properties, A is selected preferably from those propylene copolymers containing, as comonomer, from 1 to 3% of ethylene and from 5 to 10% of butylene.

One can add various additives to the polymers used to produce the films of the present invention, such as stabilizers and pigments, for example.

The films of the present invention have a thickness which ranges preferably from 10 to 100 μm, more preferably from 20 to 50 μm.

In the triple-layered film of the present invention, the middle layer preferably constitutes half the total thickness, while that of each of the outside layers is half of the remaining thickness.

The multilayered cast films of the present invention are produced by coextruding the films to be bonded using conventional process conditions.

The following analytical methods were used to carry out the analyses described in the examples:

M.I.: determined according to ASTM D 1238, condition L;

FM at 23° C.: determined according to ASTM D 790;

tensile strength at yield and at break: determined according to ASTMD-882, test velocity 50 mm/min.;

elongation at yield and at break: determined according to ASTM D-882, test velocity 50 mm/min.

Moreover, the films of the examples were subjected to the following tests:

twist retention test: the test is carried out by simulating the wrapping of a piece of candy, by using a steel ball with a 15 mm diameter which is wrapped manually in a 150×60 mm piece of the film of the present invention. The two extremities of the film are twisted in opposite directions, one for a 540° angle (one and half turn) and the other for 1080° (three turns). The twist angles are measured after 30 seconds to determine the degree of retention.

The following examples are designed to illustrate and not limit the present invention.

Composition of the polymers used in the Examples

1) Propylene homopolymer having isotactic index of 98.5;

2) Propylene homopolymer having isotactic index of 96.5;

3) Random copolymer composition comprising 50% of a propylene/ethylene random copolymer containing 4% of ethylene, and 50% of a propylene/1-butene random copolymer containing 16% of 1-butene. Said composition is obtained by sequential copolymerization in the presence of highly stereospecific Ziegler Natta catalysts supported on active magnesium chloride.

The physical properties of said polymers are illustrated in Table 1.

EXAMPLE 1

By coextrusion (using three DOLCI extruders operating at different temperatures ranging from 240° to 255° C., connected to a flat extrusion die) a 40 μm thick triple-layer cast film is prepared wherein the middle layer is a homopolymer 1) film, while the outside layers consist of propylene homopolymer 2) film. The thickness of the middle layer is double that of the outside layers.

EXAMPLE 2

A film is prepared as in Example 1, the only difference being that the thickness of the film in this example is 25 μm.

EXAMPLE 3

Using a DOLCI extruder a 40 μm triple-layer cast film is prepared, wherein the middle layer is a homopolymer 1) film, while the outside layers consist of propylene random copolymer composition 3). The thickness of the middle layer is double that of the outside layers.

EXAMPLE 4

A film is prepared as in Example 3, the only difference being that the thickness of the film in this example is 25 μm.

Comparative example 1 (1c)

A 25 μm thick film is used, said film consisting of bioriented isotactic polypropylene modified with an amorphous, low molecular weight, glassy hydrocarbon resin.

The characteristics of the film in the Examples and in the comparative Example are shown in Table 2, where MD and CD refer to "machine direction" and "cross direction" respectively.

Table 3 shows the degree of twist retention of the film immediately after the twisting and 30 seconds later.

TABLE 1

| Polymer property | Homopolymer | Homopolymer | Copolymer |
| --- | --- | --- | --- |
| M.I. (g/10 min) | 3.7 | 11 | 6 |
| F.M. (MPa) | 2300 | 1600 | 780 |
| Yield stress (MPa) | 40 | 35 | 23 |
| Elongation at yield (%) | 5 | 11 | 15 |
| Elongation at break (%) | 20 | 370 | >500 |

TABLE 2

| | | Yield | | Break | |
| --- | --- | --- | --- | --- | --- |
| Examples and Compar. ex. | FM (MPa) | Stress (MPa) | Elong. (%) | Stress (MPa) | Elong. (%) |
| 1 | 796 MD | 24.1 MD | 10.3 MD | 54.6 MD | 579 MD |
|   | 717 CD | 21.8 CD | 8.9 CD | 30.8 CD | 757 CD |
| 2 | 788 MD | 25.0 MD | 11.0 MD | 58.2 MD | 610 MD |
|   | 710 CD | 21.0 CD | 8.0 CD | 32.1 CD | 760 CD |
| 3 | 788 CD | 25.0 MD | 11.1 MD | 57.6 MD | 481 MD |
|   | 770 CD | 23.3 CD | 8.6 CD | 30.5 CD | 757 CD |
| 4 | 760 MD | 23.1 MD | 9.1 MD | 53.0 MD | 620 MD |
|   | 705 CD | 22.0 CD | 8.6 CD | 31.0 CD | 720 CD |

TABLE 2-continued

| Examples and Compar. ex. | FM (MPa) | Yield Stress (MPa) | Yield Elong. (%) | Break Stress (MPa) | Break Elong. (%) |
|---|---|---|---|---|---|
| 1c | 3500 MD | — | — | 199.0 MD | 18 MD |
|  | 1770 CD | — | — | 81.2 CD | 76 CD |

TABLE 3

| Examples and compar. ex. | Twist retention immediately (540° twist) | Twist retention after 30 seconds (1080° twist) |
|---|---|---|
| 1 | 360 | 900 |
| 2 | 360 | 720 |
| 3 | 360 | 540 |
| 4 | 360 | 720 |
| 1c | 180 | 360 |

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. The combination of an article and a multilayered cast film, said article being twist-wrapped by said film, the elongation at break of said film being greater than 100%, and said film comprising:

A) at least one layer consisting essentially of a crystalline homopolymer of a $C_3$–$C_6$ α-olefin, or a crystalline, random copolymer of propylene with ethylene or a $C_4$–$C_{10}$ α-olefin, or a crystalline, random copolymers of propylene with ethylene and a $C_4$–$C_{10}$ α-olefin, or a composition of crystalline, random copolymers selected from the group consisting of crystalline, random copolymers of propylene with ethylene, of propylene with a $C_4$–$C_8$ α-olefin, and of propylene with ethylene and a $C_4$–$C_8$ α-olefin, the elongation at break of said layer being greater than 350%; and B) at least one layer (Layer B) consisting essentially of a propylene homopolymer, or a propylene copolymer with ethylene or a $C_4$–$C_{10}$ α-olefin, or a propylene copolymer with ethylene and a $C_4$–$C_{10}$ α-olefin, the elongation at break of said homopolymer and copolymers being lower than 30%, the flexural modulus of said homopolymer and copolymers being higher than 1600 MPa, and the $M_w/M_n$ of said homopolymer and copolymers being 8–30.

2. The combination of claim 1, wherein the elongation at break of Layer B is lower than 25%.

3. The combination of claim 1, wherein the elongation at break of the film is greater than 200%.

4. The combination of claim 1 in which said composition comprises (all percentages being by weight):

(1) 30–65% of a copolymer of propylene and a $C_4$–$C_8$ α-olefin, the propylene content of which is 80–98%; and (2) 35–70% of a copolymer of propylene and ethylene, the ethylene content of which is 2–10%, or a copolymer of propylene, ethylene and a $C_4$–$C_8$ α-olefin, the ethylene content of which is 0.5–5%, and the $C_4$–$C_8$ α-olefin content of which is 2–10%.

5. The combination of claim 1 in which said article is a piece of candy.

* * * * *